United States Patent Office 3,342,546
Patented Sept. 19, 1967

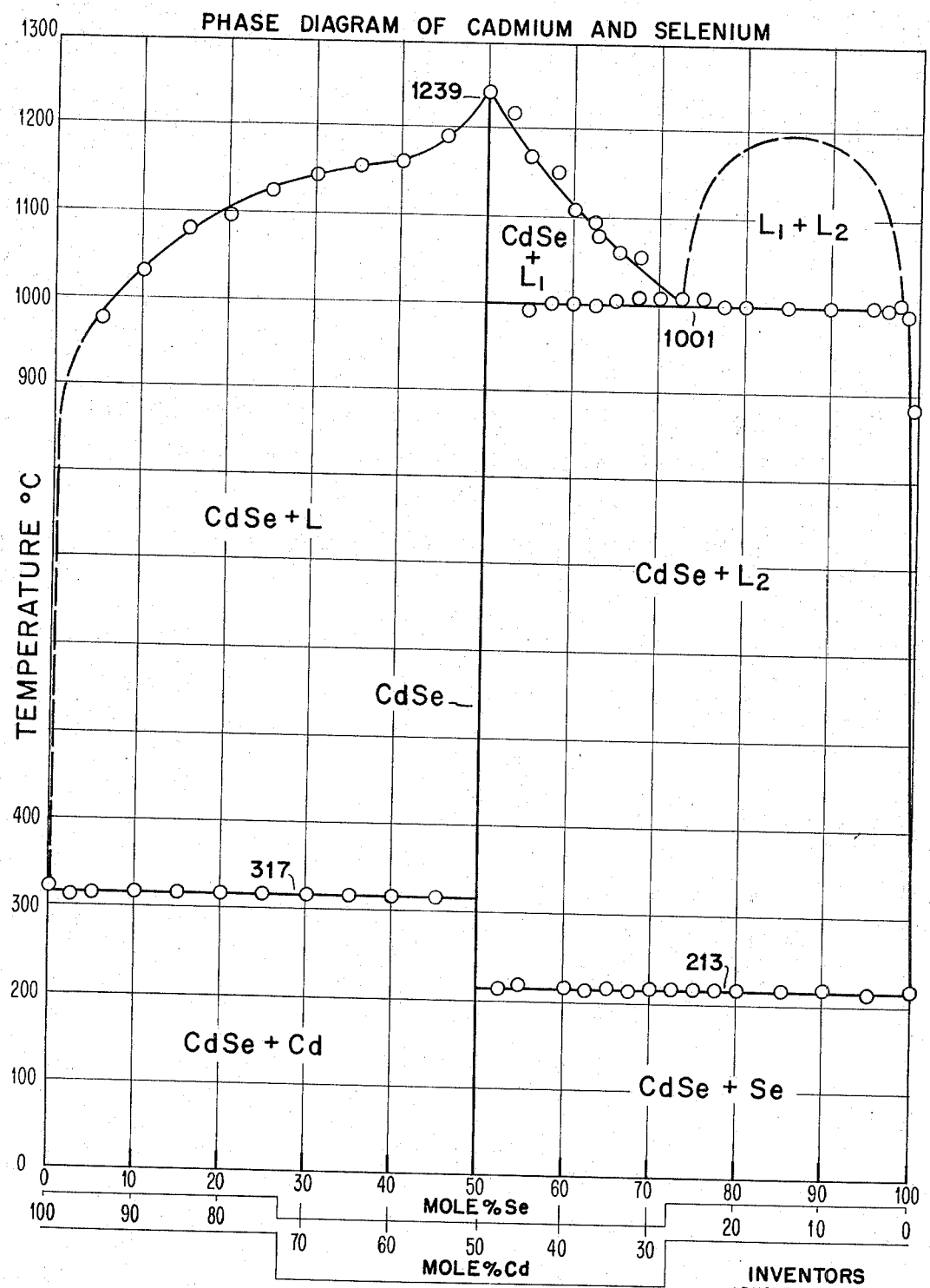

3,342,546
PROCESS FOR CONTROLLING THE PREPARATION OF BINARY COMPOUNDS
Arnold Reisman and Melvin Berkenblit, Yorktown Heights, N.Y., assignors to International Business Machines Corporation, New York, N.Y., a corporation of of New York
Filed Dec. 29, 1961, Ser. No. 163,223
12 Claims. (Cl. 23—50)

This invention relates to a process for controlling the preparation of higher melting point temperature binary compounds composed of lower melting point elements. More specifically, this invention relates to a process for the controlled pyrosynthesis directly from the elements of binary compounds having semiconducting properties, frequently photoconducting properties, where said compounds melt at temperatures higher than the elements from which they are made.

Ordinarily, it would be expected in preparing a higher melting point temperature compound from lower melting point elemental constituents that it would be possible to take these lower melting point constituents and place them together at a temperature above their respective melting points until they react. However, for the high melting point temperature binary compounds which are prepared from the elements of groups IIB, IIIB, VB, and VIB of the periodic table (copyrighted by H. D. Hubbard) and which are described herein, the reaction does not occur at temperatures slightly above the melting points of the elemental constituents, even after reaction times of several weeks. The reaction does take place at a temperature four to five times greater than the melting point temperatures of the elemental constituents, more specifically within several hundred degrees of the melting point temperature of the desired compopund. Such reactions are usually exothermic and consequently dangerous because the large quantity of heat liberated by the exothermic reaction expands the gases present, i.e. those derived from volatilization of the unreacted elemental constituents and frequently results in a detonation or explosion. This problem is particularly vexatious in controlling the preparation of reproducible binary compounds having photoconducting properties which are almost all high melting point temperature compounds composed of lower melting point elemental constituents.

It is an object of the invention to provide a method for controlling the preparation of higher melting point temperature binary compounds composed of lower melting point elements.

It is an object of the invention to provide a method for controlling the preparation of higher melting point temperature binary compounds composed of lower melting poit temperature elements where said binary compounds are insoluble in melts comprised of the lower melting point constituent elements.

It is a further object of the invention to provide a method of controlling a pyrosynthesis reaction involving the formation of a binary compound by direct combination of exothermic reacting elements.

Another object of the invention is to provide a process for controlled pyrosynthesis of a binary compound having a significantly higher melting point temperature than the elements of which it is composed by direct combination of the elements at a temperature below the melting point temperature of the compound.

A further object of the invention is to provide a process for controlled pyrosynthesis of a binary compound having a photoconducting properties which are reproducible and which has a higher melting point temperature than the melting point temperatures of the cation forming and anion forming elements of which it is composed. The cation forming elements are selected from the elements of group II–B (Zn, Cd, Hg) and group III–B (Ga, In, Tl) of the periodic table. The anion forming elements are selected from the elements of group VB (P, As, Sb) and groups VIB (S, Se, Te) of the periodic table. A still further object of the invention is to provide a process of controlling the preparation of cadmium selenide useful in the preparation of photoconductors.

The foregoing and other objects, features and advantages of the invention will be apparent from the following more particular description of preferred embodiments of the invention, as illustrated in the accompanying drawing.

Although the invention is directed to a process for controlled pyrosynthesis of binary compounds the invention is best explained by study of a specific embodiment thereof. This specific embodiment relates to the process for controlling the preparation of cadmium selenide (which has a melting point of 1239°±5° C.) by direct synthesis from the lower melting point elemental consituents, cadmium and selenium. Cadmium selenide is a semiconductor which finds application and utility in computer mechanisms as a photoconductor device material. Because of this usage the cadmium selenide must be of high purity and reproducibly uniform.

Ordinarily in the preparation of a binary compound, for example cadmium selenide, by direct synthesis from the elements (cadmium and selenium), the elements are heated together until they react. Therefore, when cadmium metal and selenium are placed in a reaction chamber nad heated to a temperature a little above (10°–15° C.) the higher melting point of the two elements i.e. cadmium melts at 320±5° and selenium melts at 215±5°, it would be expected that CdSe would form. However, it is observed that almost no cadmium selenide forms even after long periods of time e.g. one to two weeks. At temperatures 100° C. higher than the temperature of the higher melting point element, the same result was noted. When a temperature of approximately 900°–1000° C. was employed cadmium selenide was formed, but was attended by such a violent reaction that a severe detonation occurred. Frequently, this detonation cannot be contained and thus there results a destruction of the reaction vessel and consequent loss of the batch. The detonation was due to the fact that the molten cadmium and selenium reacted spontaneously and evolved prodigious quantities of heat in doing so since the reaction is exothermic. At 1000° C. the vapor pressurees of both Cd and Se are high and when this tremendous quantity of heat is liberated by the reaction, the gases present at that temperature are expanded suddenly. Thus, a detonation results.

At the lower temperature between the melting point temperature of the selenium and the cadmium (i.e. around the melting point temperature of cadmium), a passive layer or reaction inhibiting layer of cadmium selenide forms, after an initial surface reaction, over the surface of the elemental cadmium encompassing the bulk of the cadmium metal. This passive layer or reaction inhibiting layer not only restricts contact of the cadmium metal with the molten selenium, but also greatly restricts the volatilization of the cadmium thus preventing the reaction from ensuing in the vapor phase above the molten phases. By blocking the contact of the cadmium metal with the molten selenium the reaction inhibiting layer consequently limits the direct reaction of the cadmium and the selenium in a vapor phase reaction as well as in a liquid phase reaction. Thus, the reaction becomes quiescent until a temperature greater than 900°–1000° C. is reached. The reason the reaction now proceeds at this temperature is best explained with the aid of the phase diagram of cadmium and selenium.

A phase diagram is a graphical description of the solubility of the various constituents of a compound one in another as a function of the relative compositions of these constituents and temperature. Note that the phase diagram of cadmium and selenium is two dimensional and has a composition axis and a temperature axis. The composition relates the mole percent of cadmium and the mole percent of selenium in any given sample. (Mole percent is the number of molecules of the element over the total number of molecules present multiplied by 100.) Thus it is actually a molecular fraction of a composition of a sample. The weight of the sample will not affect the mole percent. The mole percentage for the elements varies from 0% to 100%. The mole percent axis is given in units of 10 mole percent. The temperature axis is given in units of 100 degrees centigrade.

Note that the phase diagram of cadmium and selenium is divided into several distinct regions of obviously different physical attributes. No vapor phase is shown in the phase diagram although one is always present. The phase diagram defines the compositions of co-existing phases as a function of temperature. The several distinct regions depicted in the phase diagram are composed of either a single phase, that above the uppermost curves, of a solid phase in equilibrium wtih a liquid (referred to as the solubility or liquidus curves), two liquid phases simultaneously co-existing (defined as a region of liquid immiscibility) or two solid phases in equilibrium (below the horizontal lines labelled 317° and 213°).

The uppermost curves define the solubility of either Cd, Se, or CdSe in a solution comprised of Cd or Se. Reading from left to right, note that a curve connects the point 320° C. on the left-hand temperature axis to a point marked 1239°. This curve shows the variation of solubility of CdSe in melts comprised of Cd and Se which contain greater than 50 mol percent Cd. At any temperature, a horizontal line extended between this curve and temperature axis at 50 mol percent Se (the composition axis for CdSe), reveals the composition of a solution in equilibrium with crystalline CdSe. For example, a line extended between this curve and the axis marked CdSe at 500° reveals that the solution in equilibrium with the crystalline CdSe has a composition of approximately 0.5 mole percent Se (therefore 99.5 mole percent Cd). As the temperature is increased, the curve rises almost vertically until approximately 900°, at which point it ascends less steeply. Alternatively it may be stated that in the interval 320° C.–900° C., the solubility of CdSe in Se is relatively constant and small. Above this temperature, a horizontal between the solubility curve and the CdSe axis reveals that the solution is richer in Cd, as for example, at 1100°, the solution composition is approximately 20 mole percent Se, or alternately it is richer in CdSe, meaning that more of the latter is dissolved. Below 317° C. in the composition range 0–50 mole percent Se, two phases, both solids, co-exist at all temperatures. These phases exhibit the structures of Cd metal and CdSe. As one varies the composition of the total system in the range 0–50 mole percent Se, the nature of the co-existing phases remains the same and only the relative amounts of these phases change. Thus, in the liquid-CdSe crystal region, movement to the right toward the CdSe axis at any temperature merely involves an increase in the quantity of crystalline solid phase, but not the composition of said phase. Similarly, in the region in which solid Cd structure and solid CdSe structure phases co-exist movement to the right results in increasing the quantity, but not the composition of the CdSe structure phase.

In the region to the right of the CdSe axis an analogous set of conditions prevails except that below 213° C. the CdSe structure phase co-exists with Se structure phase. Also, above 1001°, a region exists in which two liquid phases, analogous to an oil water mixture, co-exist. These liquid co-existing phases are comprised of one liquid richer in Se than the other.

It is evident that CdSe exhibits very limited solubility in each region of the diagram as defined by the axis Cd–CdSe and CdSe–Se, until temperatures much in excess of the melting point temperature of Cd or Se are attained. Note also that the melting point of CdSe is appreciably greater than that of either Cd or Se and that the melting point of Cd is greater than the melting point of Se.

From this phase diagram of the system Cd–Se or alternatively the systems Cd–CdSe and Se–CdSe, it is to be noted that the solubility of CdSe, which melts at a temperature higher than either of the melting point temperatures of the constituent elements Cd and Se, in solutions comprised of Cd and Se in varying amounts is low up to a temperature of 900°–1000° C. Thus, the solubility of CdSe in a Cd rich solution is low until 900°–1000° C., and in a Se rich solution is low until 1000° C. Furthermore, this low solubility of CdSe coupled with the known low vapor pressure of CdSe below 900° C. produces a situation such that if Cd and Se are reacted at around the melting point of Cd, an initial reaction takes place over the surface of the cadmium forming a reaction inhibiting layer around each of the Cd particles. Each of these particles will then separately comprise a system rich in Cd and deficient in CdSe. This CdSe deficient system will exhibit a low CdSe solubility until 900–1000° C., and consequently the reaction inhibiting CdSe layer which has formed will remain intact. Contributing to the phenomenon is the fact that the molten particles of Cd encompassed by the reaction inhibiting layer of CdSe are simultaneously enveloped in a molten matrix of Se in which the CdSe is also insoluble up to 1000° C. Thus, the reaction inhibiting layer will not be dissolved by either the molten Cd or Se phases. It has been also observed that the reaction inhibiting layer of CdSe is essentially impervious to the vapors of both Cd and Se further preventing the possibility of reaction via diffusion or vapor mechanisms.

When the temperature is raised sufficiently, the reaction inhibiting layer becomes more soluble and concurrently achieves a higher vapor pressure and then deteriorates sufficiently so as not to be able to contain the molten cadmium encompassed mass which has in the meantime also acquired a high vapor pressure. The thus released molten Cd metal is then free to react with the molten Se and it does so, spontaneously and exothermically with the release of copious quantities of heat. The product of said reaction, CdSe is now soluble in the liquid phases present and no longer passivates or acts as a reaction inhibitor. The net result of such spontaneous reaction is adiabatic expansion of gases building up large pressures. Such large pressures may rupture the sealed container in which the reactions are conducted and produce a detonation.

It has been determined by experiments that it is the Cd metal upon which this reaction inhibiting layer of CdSe forms since the Se has completely melted prior to the initial reaction over the surface of the Cd which leads to the formation of the CdSe reaction inhibiting layer.

Thus, it is readily apparent from the above discussion of the phase diagram that the lack of solubility of cadmium selenide in the selenium rich phases or the cadmium rich phases plus the known low vapor pressure of the cadmium selenide, prevents the reaction of cadmium with selenium at the lower temperatures (i.e. around the melting point temperature of Cd) because a reaction inhibiting layer of cadmium selenide forms after an initial surface reaction over the surface of the cadmium metal encompassing it. Thus, all further reaction between the cadmium and selenium cease until a temperature is reached which breaks down this cadmium selenide reaction inhibiting layer.

The process of the invention utilizes the knowledge of the formation of the CdSe reaction inhibiting layer around the elemental cadmium (the higher melting point temperature element of the pair of elements composing the binary compound CdSe) during the reaction by using cadmium comminuted to a particle size sufficiently small that the particle size of the cadmium is less than the thickness of the CdSe reaction inhibiting layer which tends to form thereon. Consequently, although the CdSe reaction inhibiting layer forms, said layer consumes all of the cadmium before it attains its reaction inhibiting thickness (or passivating thickness), and therefore, the synthesis reaction is carried to completion.

The process of the invention is essentially the same irrespective of the relative composition of the starting materials. The starting materials become important depending on what is desired once the process is completed. Thus, if it does not matter whether the cadmium selenide to be formed is either stoichiometric or nonstoichiometric within some predescribed limits set solely by an analytical balance or other means of apportioning desired compositions, various purities of cadmium metal may be used in the process. Cadmium metal which has an oxide coating on it (e.g. such that it may be equivalent to as high as four or five percent cadmium oxide) may be used as if it were comprised solely of cadmium metal. When this cadmium metal with the oxide coating is reacted with selenium in the method outlined and there results a product which may have a variation of selenium to cadmium by as much as 3 parts per thousand deviation from the stoichiometry and may therefore contain certain impurities.

On the other hand should a so called stoichiometric CdSe be desired, that is, stoichiometric with the capability of apportioning the proper Cd and Se composition (i.e. 2 parts in 50,000 when preparing a 50 g. batch using an analytical balance), a specially prepared Cd metal must be used.

Cadmium powder generally is coated with an oxide to some degree. This oxide prior to the use of the cadmium is removed in one of two ways. It is removed either by treatment in a concentrated solution of ammonium hydroxide, washed with pure water and then dried either in air or vacuum at about 100° C.; or else it is reduced in pure hydrogen at 200° C. for five hours. Thus an oxide free cadmium powder is obtained.

The cadmium used in the pyrosynthesis must be of a particle size which is less than the thickness of the CdSe reaction inhibiting layer which tends to form during the reaction around the cadmium otherwise the reaction inhibiting layer reaches a thickness around the cadmium which prevents the synthesis from going to completion. A particle size not greater than and preferably less than 44 microns has been found to effect complete reaction under the conditions outlined previously. A particle of 44 microns will pass through a No. 325 mesh screen (U.S. Standard Sieve Series—1940). Cadmium in larger pieces may be comminuted to this particle size or it may be obtained commercially in this particle size. There is a correlation between the particle size and the completion of the reaction at a given rate.

The particle size of the selenium is not critical because the reaction does not ensue before the melting point of Cd is reached (melting point Cd —320° C.) due to the fact that the Se melting point is lower than the Cd melting point and thus the Se will melt irrespective of whether it started out as a fine powder or as large chunks. It may be present as shot (⅛″) (No. 6 mesh screen) or as a particle of the same size as the cadmium particles (No. 325 mesh screen). However, in mixing the reactant it is easier to obtain a more homogeneous mixture by ball milling or other means of powder mixing. Thus it is preferred that the Cd and Se particles be 44 microns or less.

Should Se shot be employed it is necessary frequently to grind the product obtained after the initial reaction and repeat the entire reaction procedure once more at a temperature increment of from .1 to 5°/minute or greater. The critical part of the process in terms of materials is the particle size of the cadmium (which is the higher melting point element of the binary compound CdSe).

The cadmium and selenium are then mixed. These elements may be mixed various proportions to effect any range of stoichiometry within the solubility limits of cadmium in cadmium selenide (e.g. .25–.5 mole percent excess Cd with reference to the phase diagram) or selenium in cadmium selenide, or in proper stoichiometry to give exactly cadmium selenide within the limits of weighing, or in proper amounts to give a final product having a second phase present as, for example, CdSe plus a Cd rich phase or CdSe plus a rich Se phase. Various ratios have been tried which demonstrate that the stoichiometry may be varied to within 2 parts in 50,000 and nonstoichiometric to as much as 2 percent excess cadmium or 1 percent excess selenium on a mole to mole basis of Cd to Se in the mixes.

The mixture of cadmium and selenium is then placed in an ampoule which has been scrupulously cleaned and whose vapor to condensed phase ratio (gas to solid phase ratio) is very small so that the vapor pressure into which cadmium selenide or something of lesser or greater stoichiometry might volatilize does not significantly change the composition of the condensed phase. The ampoule is constructed of either quartz or Pyrex to give adequate strength. The ampoule is then evacuated and sealed. The reaction must be conducted in sealed ampoules because if it is not the Se will volatilize long before the reaction has occurred since the Se has a high vapor pressure at elevated temperatures and is not encapsulated by a passive layer. If desired an ampoule containing inert gas (e.g. argon, neon, krypton, xenon etc.) may be used in place of the evacuated ampoule. Next the ampoules are placed in a furnace whose temperature and rate of temperature rise may be controlled. Four, five or more ampoules are simultaneously placed in the furnace into holes which have been cut into the bricks to accommodate the ampoules. The bricks are so placed that the ampoules are generally horizontal or at a slight tilt.

The temperature of the furnace and thus the ampoules is raised at a rate approaching 0° C. per minute, but because there are practical considerations, namely reasonable operation time periods, the synthesis is carried out at faster rates. The rate of heating is variable. For the preparation of cadmium selenide in which neither of the starting elements is detected in the unreacted state a rate from 0.1° C. to 2° C. per minute up to 450°–500° C. can be used. Preferably, the temperature rate is from 0.5° C. to 1° C. per minute up to 500° C. There is no soaking period required at the elevated temperature (by soaking is meant leaving the sample at the maximum temperature which the furnace obtains for a reasonable period to permit equilibrium to occur).

The sample is then either slowly cooled from 450°–500° C. or immediately air quenched to room temperature. The rate of cooling the sample appears to have no effect on the cadmium selenide which results.

Cadmium selenide prepared according to the process of the invention may be subsequently ground for use in photoconductive applications, e.g. the preparation of sintered layer multi-element or single element devices, photoconductor single crystals or thin films. The sintered layer multi-element or single element device, depending on which is desired, can be utilized in logic circuits in the slower speed computing machines. These devices can also be put into any use for which photoconductors have previously been employed; such as light sensing meters for example, electric eyes or photoelectric cells.

The specific examples set forth below illustrate the preparation of cadmium selenide by the process of the invention.

EXAMPLE 1

Cadmium metal from which the oxide has been removed is comminuted to a particle size such that all the particles will pass through a No. 325 mesh screen (U.S. Standard Sieve Series—1940) (no particle greater than 44 microns in size). This comminuted cadmium powder (29.3682 gm.) is mixed with selenium shot (⅛") (20.6318 gm.) that will pass through a No. 6 mesh screen. This mixture is then placed in a quartz ampoule whose vapor to condensed phase ratio is small. The ampoule is evacuated, sealed and placed into a furnace at room temperature and the temperature is raised at the rate of 0.5° per minute to 500° C. There was no detonation. The heating cycle is repeated once more after the sample is ground to a particle size less than 44 microns. Cadmium selenide resulted (a yield of approximately 50 gm. less mechanical loss). The reaction is considered to have gone to completion since neither of the constituent elements could be detected by various analytical techniques, such as X-ray analysis and differential thermal analysis.

EXAMPLE 2

The process of Example 1 was repeated except that both the cadmium (29.3682 gm.) and the selenium (20.6318 gm.) were comminuted to a particle size such that all the particles will pass through a No. 325 mesh screen (44 microns) and the temperature was raised 1° C. per minute to 500° C. The entire procedure of the instant example was repeated again except at a heating rate of .5°/minute to 500° C. No detonation was observed in either instance. Cadmium selenide resulted—the reaction had gone to completion.

EXAMPLE 3

The process of Example 1 was repeated except that cadmium shot (⅛") (29.3682 gm.) that will pass through a No. 6 mesh screen was used. At temperatures about 500° C., the reaction did not go to completion. There was elemental cadmium and selenium present in the ampoule. At temperatures above 1000° C. there was a detonation which broke the quartz ampoule.

EXAMPLE 4

The process of Example 1 was repeated using the various particle sizes and rates of heating listed with the results indicated.

| Cd | Se | Rate | Result |
|---|---|---|---|
| No. 325 mesh screen (29.3682 gm.). | No. 6 mesh screen (20.6318 gm.) | .1°/min. to 500° C | Reaction went to completion. No detonation. (50 gm.) |
| Do | No. 325 mesh screen (20.6318 gm.). | 1.5°/min. to 500° C | Do. |
| Do | No. 6 mesh screen (20.6318 gm.) | 2.0°/min. to 500° C | Do.[1] |
| Do | No. 325 mesh screen (20.6318 gm.) | 2.0°/min. to 500° C | Do. |
| Do | No. 6 mesh screen (20.6318 gm.) | 1.5°/min. to 500° C | Do.[1] |
| Do | No. 325 mesh screen (20.6318 gm.). | .1°/min. to 500° C | Do. |

[1] Reaction went to completion only after an intermediate grinding to a particle size less than 44 microns and a temperature recycling was effected.

The following specific examples set forth in Table I illustrate the practice of the invention with respect to the formation of various binary compounds other than cadmium selenide.

The procedure followed in these examples is as follows: The higher melting point temperature element is comminuted to the particle size indicated and then is mixed with the lower melting point temperature element in the particle size indicated. The mixture is then placed in a quartz ampoule and heated at the rate set forth until the temperature indicated is reached, and then thereafter air quenched. Whether or not the reaction is considered to have gone to completion in forming the desired compound is indicated in the column headed "Status of the Reaction." Thus, for example, the reaction is considered to have been completed when the initial reacting elements are entirely consumed. The reactions which are incomplete can be carried to completion by raising the temperature of the reaction above the melting point of the compound being formed. As this temperature, the reaction inhibiting layer formed around the higher melting point temperature element is melted and deteriorates because this layer is the compound which is being formed. Thus the released molten element is free to react. A detonation frequently results due to the exothermic nature of the reaction.

TABLE I

| Example No. and Compound to be formed | Higher Melting Point Temperature Element and Particle Size | Lower Melting Point Temperature Element and Particle Size | Rate of Heating | Status of Reaction |
|---|---|---|---|---|
| 5 — Zn$_3$P$_2$ | P, No. 325 mesh screen (44 microns) (12.0011 gm.). | Zn, No. 7 mesh screen (2,830 microns) (37.9989 gm.). | 1.5° C./min. to 600° C | Completed.[1] |
|  | P, No. 6 mesh screen (12.0011 gm.) | Zn, No. 7 mesh screen (37.9989 gm.) | do | Incomplete.[1] |
| 6 — Zn$_3$As$_2$ | As, No. 400 mesh screen (37 microns) (21.6527 gm.). | Zn, No. 400 mesh screen (2,830 microns) (28.3473 gm.). | 5° C./min. to 850° C | Completed.[1] |
|  | As, No. 400 mesh screen (21.6527 gm.) | Zn, No. 400 mesh screen (28.3473 gm.) | .1° C./min. to 850° C | Do.[1] |
| 7 — Zn$_3$Sb$_2$ | Sb, No. 400 mesh screen (37 microns) (27.6943 gm.). | Zn, No. 400 mesh screen (2,830 microns) (22.3057 gm.). | 5° C./min. to 650° C | Do.[1] |
| 8 — ZnS | Zn, No. 325 mesh screen (44 microns) (33.5419 gm.). | S, No. 7 mesh screen (2,830 microns) (16.4581 gm.). | 3° C./min. to 500° C | Do. |
|  | Zn, No. 6 mesh screen (33.5419 gm.) | S, No. 7 mesh screen (16.4581 gm.) | do | Incomplete.[1] |
| 9 — ZnSe | Zn, No. 325 mesh screen (44 microns) (22.6476 gm.). | Se, No. 7 mesh screen (27.3524 gm.) | 3° C./min. to 600° C | Completed.[1] |
|  |  | Se, No. 325 mesh screen (27.3524 gm.) | .1° C./min. to 500° C | Do. |
|  | do | Se, No. 7 mesh screen (27.3524 gm.) | 3° C./min. to 750° C | Incomplete.[1] |
| 10 — ZnTe | Zn, No. 6 mesh screen (22.6476 gm.) | Te, No. 325 mesh screen (33.0612 gm.) | 3° C./min. to 500° C | Completed.[1] |
| 11 — Cd$_3$P$_2$ | Zn, No. 325 mesh screen (16.9387 gm.) | Cd, No. 400 mesh screen (42.2392 gm.) | .5° C./min. to 650° C | Do.[1] |
|  | P, No. 400 mesh screen (7.7608 gm.) | Cd, No. 325 mesh screen (42.2392 gm.) | 2.5° C./min. to 700° C | Do.[1] |
|  | P, No. 325 mesh screen (7.7608 gm.) |  | do | Do.[1] |
|  | do | Cd, No. 7 mesh screen (42.2392 gm.) | 2° C./min. to 500° C | Do.[1] |
| 12 — CdS | Cd, No. 325 mesh screen (38.9017 gm.) | S, No. 325 mesh screen (11.0983 gm.) | .5° C./min. to 450° C | Do.[1] |
|  | Cd, No. 400 mesh screen (38.9017 gm.) | S, No. 400 mesh screen (11.0983 gm.) | .1° C./min. to 450° C | Do.[1] |
|  | Cd, No. 325 mesh screen (38.9017 gm.) | S, No. 7 mesh screen (11.0983 gm.) | .1° C./min. to 500° C | Incomplete.[1] |
|  | Cd, No. 7 mesh screen (38.9017 gm.) | do | 3° C./min. to 500° C | Completed.[1] |
| 13 — CdTe | Te, No. 325 mesh screen (26.5837 gm.) | Cd, No. 325 mesh screen (23.4163 gm.) | 1.5° C./min. to 500° C | Incomplete.[1] |
|  | Te, No. 7 mesh screen (26.5837 gm.) | do | do | Completed.[1] |
|  | Te, No. 325 mesh screen (26.5837 gm.) | Cd, No. 325 mesh screen (23.4163 gm.) | 2.5° C./min. to 800° C | Do.[1] |
| 14 — GaP | P, No. 325 mesh screen (15.3826 gm.) | Ga, No. 7 mesh screen (34.6174 gm.) | do | Do.[1] |
|  | do | Ga, No. 325 mesh screen (34.6174 gm.) | 1° C./min. to 950° C | Do.[1] |
| 15 — GaAs | As, No. 325 mesh screen (25.8971 gm.) | Ga, No. 7 mesh screen (24.1029 gm.) | do | Do.[1] |
|  | As, No. 400 mesh screen (25.8971 gm.) | Ga, No. 400 mesh screen (24.1029 gm.) |  |  |

[1] 50 gm.

In summary, this invention is applicable to the pyrosynthesis of binary compounds, which have a higher melting point temperature than the elements of which it is composed, by the direct combination of the elements at a temperature below the melting point temperature of the compound when the compound is relatively insoluble in solutions of the elements around their melting point temperatures as defined by the phase diagram for these elements. The binary compounds that can be prepared according to the process of the invention are composed of cation forming and anion forming elements. The cation forming elements can be selected from the group IIB (Zn, Cd, Hg) and the group IIIB (Ga, In, Tl) elements of the periodic table. The anion forming elements can be selected from the group VB (P, As, Sb) and the group VIB (S, Se, Te) elements of the periodic table.

The control technique of the process of the invention utilizes the knowledge of the formation of a reaction inhibiting layer, which is itself the desired compound, around the element with the highest melting point temperature of the pair of elements composing the binary compound during the reaction by comminuting the element with the higher melting point to a particle size sufficiently small that the particle size of the element with the higher melting point is less than the thickness of the reaction inhibiting layer which tends to form thereon. Thus, even though the reaction inhibiting layer forms, the layer consumes all of the element with the higher melting point temperature before said layer attains its reaction inhibiting thickness, and consequently the pyrosynthesis reaction is carried to completion.

The element of each pair with the higher melting point temperature is comminuted to a particle size not greater than 44 microns (i.e. the particle will pass completely through a No. 325 mesh screen) and then mixed with the second element. (The second or lower melting point temperature element of the pair may have also been comminuted to the same particle size as the higher melting point temperature element.) This mixture is enclosed in a sealed evacuated capsule or ampoule (usually quartz) and heated at a rate sufficiently slow that the reaction goes to completion and ensues non-detonatively around the melting point temperature of the higher melting point element. This heating rate is usually between 0.1° to 5° C. per minute, and the sample is brought to the temperature above that of the highest melting point temperature constitutent at which the reaction is observed to terminate as determined by experiment. This generally occurs anywhere from 5°–100° C. above the melting point temperature of the higher melting point temperature constituent, depending on heating rate and initial reaction mass. The compound is then slowly cooled or air quenched. Typical binary compounds which may be made by the process of the invention are $Zn_3P_2$, $Zn_3As_2$, $Zn_3Sb_2$, ZnS, ZnSe, ZnTe, $Cd_3P_2$, CdS, CdSe, CdTe, GaP, GaAs et cetera.

While the invention has been particularly shown and described with reference to preferred embodiments thereof, it will be understood by those skilled in the art that various changes in form and details may be made therein without departing from the spirit and scope of the invention.

What is claimed is:

1. A method for preparing a binary compound by the direct combination of exothermic reacting elements, said compound having a melting point temperature significantly higher than its constituent elements, and being relatively insoluble in a solution of its constituent elements and is formed at a temperature below its melting point temperature, comprising the steps of:
    (a) comminuting the reacting elements, with the higher melting point temperature element being comminuted to a particle size of no greater than 44 microns,
    (b) mixing the comminuted elements,
    (c) inserting the mixture into an ampoule,
    (d) heating the mixture at a rate of from about 0.1° C. per minute to 5° C. per minute, to a temperature of about the melting point temperature of the higher melting element at which temperature the reaction goes to completion.

2. A method according to claim 1, wherein one of the elements is a cationic element selected from the groups consisting of II and III of the periodic table and the other element is an anionic element selected from the groups consisting of V and VI of the periodic table as the reactants.

3. A method according to claim 2 wherein the reacting elements are cadmium and selenium.

4. A method according to claim 2 wherein the reacting elements are zinc and tellurium.

5. A method according to claim 2 wherein the reacting elements are gallium and arsenic.

6. A method according to claim 2 wherein the reacting elements are gallium and phosphorous.

7. A method according to claim 2 wherein the reacting elements are cadmium and sulfur.

8. A method according to claim 2 wherein the reacting elements are zinc and sulfur.

9. A method according to claim 2 wherein the reacting elements are zinc and selenium.

10. A method according to claim 2 wherein the reacting elements are cadmium and phosphorous.

11. A method according to claim 2 wherein the reacting elements are zinc and phosphorous.

12. A method according to claim 2 wherein the reacting elements are cadmium and tellurium.

References Cited

UNITED STATES PATENTS

| | | | |
|---|---|---|---|
| 2,862,787 | 12/1958 | Sequin et al. | 23—50 X |
| 3,008,797 | 11/1961 | Bither | 23—50 X |
| 3,012,899 | 12/1961 | Giordano | 23—50 X |
| 3,116,253 | 12/1963 | Brixner | 23—315 |

OSCAR R. VERTIZ, *Primary Examiner.*

H. S. MILLER, *Assistant Examiner.*